United States Patent [19]
Lorton et al.

[11] Patent Number: 6,078,698
[45] Date of Patent: *Jun. 20, 2000

[54] SYSTEM FOR READING DATA GLYPHS

[75] Inventors: Christopher W. Lorton, Bothell; James C. Griner, Woodinville; Creed F. Jones, III, Lake Stevens; Richard P. Williams, Monroe; Larry Rystrom, Mill Creek; James D. Orrell, III, Bothell, all of Wash.

[73] Assignee: Flir Systems, Inc., Portland, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 09/399,638

[22] Filed: Sep. 20, 1999

Related U.S. Application Data

[60] Provisional application No. 60/125,797, Mar. 23, 1999, and provisional application No. 60/129,742, Apr. 16, 1999.

[51] Int. Cl.$^7$ ............................ G06K 15/316; G06K 9/64
[52] U.S. Cl. .............................................. 382/278; 235/494
[58] Field of Search ............................... 235/494; 382/278

[56] References Cited

U.S. PATENT DOCUMENTS

| | | |
|---|---|---|
| 3,260,517 | 7/1966 | Sather . |
| 3,570,840 | 3/1971 | Sather et al. . |
| 3,588,086 | 6/1971 | Bell . |
| 3,606,728 | 9/1971 | Sather et al. . |
| 3,652,828 | 3/1972 | Sather et al. . |
| 3,949,363 | 4/1976 | Holm . |
| 4,061,900 | 12/1977 | Masciarelli . |
| 4,251,798 | 2/1981 | Swartz et al. . |
| 4,369,361 | 1/1983 | Swartz et al. . |
| 4,387,297 | 6/1983 | Swartz et al. . |
| 4,402,088 | 8/1983 | McWaters et al. . |
| 4,408,344 | 10/1983 | McWaters et al. . |
| 4,409,470 | 10/1983 | Shepard et al. . |
| 4,435,732 | 3/1984 | Hyatt . |
| 4,473,746 | 9/1984 | Edmonds . |
| 4,488,679 | 12/1984 | Bockholt et al. . |
| 4,542,528 | 9/1985 | Sanner et al. . |
| 4,639,873 | 1/1987 | Baggarly et al. . |
| 4,672,457 | 6/1987 | Hyatt . |
| 4,728,195 | 3/1988 | Silver . |
| 4,743,773 | 5/1988 | Katana et al. . |
| 4,760,248 | 7/1988 | Swartz et al. . |
| 4,782,220 | 11/1988 | Shuren . |
| 4,794,239 | 12/1988 | Allais . |
| 4,855,581 | 8/1989 | Mertel et al. . |
| 4,861,972 | 8/1989 | Elliott et al. . |
| 4,874,933 | 10/1989 | Sanner . |
| 4,879,456 | 11/1989 | Cherry et al. . |
| 4,896,026 | 1/1990 | Krichever et al. . |
| 4,972,359 | 11/1990 | Silver et al. . |
| 4,998,010 | 3/1991 | Chandler et al. . |
| 5,013,022 | 5/1991 | Graushar . |
| 5,033,725 | 7/1991 | van Duursen . |
| 5,039,075 | 8/1991 | Mayer . |
| 5,060,980 | 10/1991 | Johnson et al. . |
| 5,067,088 | 11/1991 | Schneiderhan . |
| 5,114,128 | 5/1992 | Harris, Jr. et al. . |
| 5,135,160 | 8/1992 | Tasaki . |
| 5,144,118 | 9/1992 | Actis et al. . |
| 5,184,005 | 2/1993 | Ukai et al. . |
| 5,191,540 | 3/1993 | Ramsey . |
| 5,192,856 | 3/1993 | Schaham . |
| 5,196,684 | 3/1993 | Lum et al. . |
| 5,220,770 | 6/1993 | Szewczyk et al. . |

(List continued on next page.)

Primary Examiner—Harold I. Pitts
Attorney, Agent, or Firm—Kolisch, Hartwell, Dickinson, McCormack & Heuser

[57] ABSTRACT

A high speed system for locating and decoding glyphs on documents is disclosed. The system includes acquiring one or more images of a document containing a glyph. One-dimensional projections of the images are correlated against a reference function to locate the glyph in the images. The position of the glyph is refined by correlating against a kernel designed to have a maximum response when aligned over a corner of the glyph. Symbols in the glyph are decoded utilizing a kernel which generates a positive response for one symbol type and a negative response for the other.

21 Claims, 6 Drawing Sheets

U.S. PATENT DOCUMENTS

| | | |
|---|---|---|
| 5,237,161 | 8/1993 | Grodevant . |
| 5,239,169 | 8/1993 | Thomas . |
| 5,245,168 | 9/1993 | Shigeta et al. . |
| 5,260,554 | 11/1993 | Grodevant . |
| 5,276,315 | 1/1994 | Surka . |
| 5,291,009 | 3/1994 | Roustaei . |
| 5,304,786 | 4/1994 | Pavlidis et al. . |
| 5,308,962 | 5/1994 | Havens et al. . |
| 5,317,654 | 5/1994 | Perry et al. . |
| 5,329,104 | 7/1994 | Ouchi et al. . |
| 5,349,172 | 9/1994 | Roustaei . |
| 5,352,879 | 10/1994 | Milch . |
| 5,354,977 | 10/1994 | Roustaei . |
| 5,359,185 | 10/1994 | Hanson . |
| 5,367,439 | 11/1994 | Mayer et al. . |
| 5,377,003 | 12/1994 | Lewis et al. . |
| 5,383,130 | 1/1995 | Kalisiak . |
| 5,396,260 | 3/1995 | Adel et al. . |
| 5,408,084 | 4/1995 | Brandorff et al. . |
| 5,414,270 | 5/1995 | Henderson et al. . |
| 5,448,049 | 9/1995 | Shafer et al. . |
| 5,459,307 | 10/1995 | Klotz, Jr. . |
| 5,468,946 | 11/1995 | Oliver . |
| 5,481,098 | 1/1996 | Davis et al. . |
| 5,481,620 | 1/1996 | Vaidyanathan . |
| 5,486,686 | 1/1996 | Zdybel, Jr. et al. . |
| 5,495,537 | 2/1996 | Bedrosian et al. . |
| 5,510,997 | 4/1996 | Hines et al. . |
| 5,521,372 | 5/1996 | Hecht et al. . |
| 5,526,050 | 6/1996 | King et al. . |
| 5,528,368 | 6/1996 | Lewis et al. . |
| 5,532,467 | 7/1996 | Roustaei . |
| 5,536,924 | 7/1996 | Ackley . |
| 5,536,928 | 7/1996 | Seigel . |
| 5,548,326 | 8/1996 | Michael . |
| 5,576,532 | 11/1996 | Hecht . |
| 5,583,954 | 12/1996 | Garakani . |
| 5,593,017 | 1/1997 | Powell et al. . |
| 5,600,121 | 2/1997 | Kahn et al. . |
| 5,602,937 | 2/1997 | Bedrosian et al. . |
| 5,608,639 | 3/1997 | Twardowski et al. . |
| 5,608,820 | 3/1997 | Vaidyanathan . |
| 5,637,854 | 6/1997 | Thomas . |
| 5,640,199 | 6/1997 | Garakani et al. . |
| 5,655,759 | 8/1997 | Perkins et al. . |
| 5,657,403 | 8/1997 | Wolff et al. . |
| 5,659,167 | 8/1997 | Wang et al. . |
| 5,673,334 | 9/1997 | Nichani et al. . |
| 5,676,302 | 10/1997 | Petry, III . |
| 5,697,699 | 12/1997 | Seo et al. . |
| 5,707,055 | 1/1998 | DeJoseph et al. . |
| 5,710,417 | 1/1998 | Joseph et al. . |
| 5,717,785 | 2/1998 | Silver . |
| 5,726,434 | 3/1998 | Seo . |
| 5,729,003 | 3/1998 | Briggs, III . |
| 5,734,566 | 3/1998 | Stengl . |
| 5,734,747 | 3/1998 | Vaidyanathan . |
| 5,739,518 | 4/1998 | Wang . |
| 5,742,037 | 4/1998 | Scola et al. . |
| 5,742,504 | 4/1998 | Meyer et al. . |
| 5,744,790 | 4/1998 | Li . |
| 5,751,853 | 5/1998 | Michael . |
| 5,754,670 | 5/1998 | Shin et al. . |
| 5,754,679 | 5/1998 | Koljonen et al. . |
| 5,756,981 | 5/1998 | Roustaei et al. . |
| 5,763,864 | 6/1998 | O'Hagan et al. . |
| 5,768,443 | 6/1998 | Michael et al. . |
| 5,777,314 | 7/1998 | Roustaei . |
| 5,777,743 | 7/1998 | Bacchi et al. . |
| 5,780,831 | 7/1998 | Seo et al. . |
| 5,783,811 | 7/1998 | Feng et al. . |
| 5,786,582 | 7/1998 | Roustaei et al. . |
| 5,793,031 | 8/1998 | Tani et al. . |
| 5,801,371 | 9/1998 | Kahn et al. . |
| 5,826,271 | 1/1999 | Petrie ........................................ 382/278 |
| 5,862,271 | 1/1999 | Petrie . |

VERTICAL PROJECTION

56

HORIZONTAL PROJECTION

SAWTOOTH CORRELATION KERNEL

Fig. 10
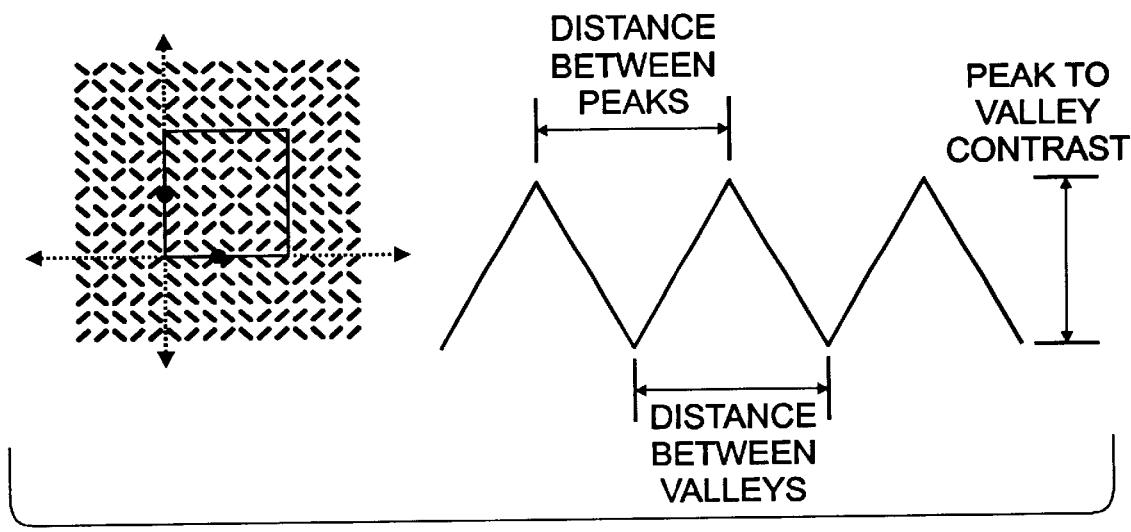
Fig. 12
| | 1 | 1 | 1 |
|---|---|---|---|
| 1 | -1 | -1 | -1 |
| 1 | -1 | -1 | |
70 (arrow to top-right cell); 72 (arrow to bottom-right area)
Fig. 13
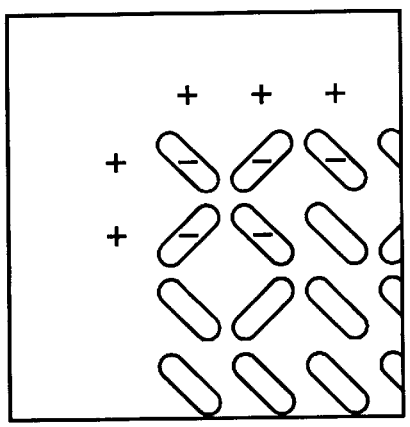
Fig. 14
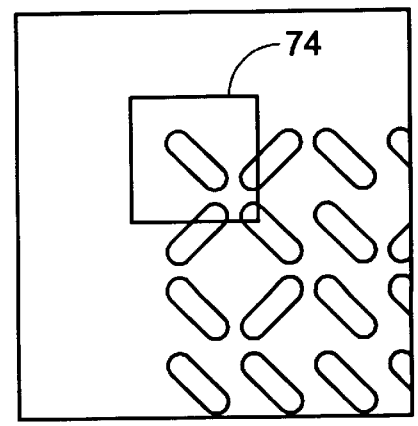

SYSTEM FOR READING DATA GLYPHS

CROSS-REFERENCE TO RELATED APPLICATIONS

This application claims priority from U.S. Provisional Patent Application Ser. No. 60/125,797, filed Mar. 23, 1999, and U.S. Provisional Patent Application Ser. No. 60/129,742, filed Apr. 16, 1999.

FIELD OF THE INVENTION

The present invention relates generally to machine vision systems, and more specifically to a system for rapidly reading data glyphs.

BACKGROUND AND SUMMARY OF THE INVENTION

Automated document factories are mechanized assembly lines that may print, collate, label, sort, or otherwise process documents, such as bills, statements and advertisements, to be assembled for mass mailing. Examples of automated document factories are disclosed in U.S. Pat. Nos. 5,510,997 and 5,608,639, which are incorporated herein by reference. In an automated document factory, the documents to be assembled or otherwise processed often are identified by various symbologies printed on the documents, such as barcodes or dataglyphs, several of which are discussed in U.S. Pat. Nos. 5,276,315, 5,329,104 and 5,801,371, which are also incorporated herein by reference.

Data glyphs can be preprinted on stock permit automated identification of print stock to insure that the correct materials are being used. Data glyphs can also be printed on the stock as it goes through the printer to identify the intended recipient of the document or some other materials that should be associated with the printed item. By reading the printed glyphs during subsequent processing, collation and handling of documents can be verified and automated.

Documents in automated document factories are moved on conveyer belts, usually at high speed. As a result it is necessary to scan the documents quickly and process the acquired data in a minimum time. Preferably, a proximity sensor is used to monitor when a document or other object to be read has moved within range of a camera of the machine vision system. When the proximity sensor detects a document, a pulsed illuminator is triggered so that the camera may obtain a clear picture of the document to be read even though the document is moving continuously. The rapid flash of the illuminator "freezes" the document for the camera. Examples of pulsed LED and other light sources are disclosed in U.S. Pat. Nos. 4,542,528, 5,135,160, 5,349,172 and 5,600,121 which are incorporated herein by reference.

Unfortunately, although existing systems permit scanning of documents at sufficient rates, the process of analyzing the scanned data to extract the data encoded in data glyphs has been an impediment to rapid document processing. In particular, with existing systems, there is no feasible process for extracting the data glyph data from scanned images quickly enough to allow for real time processing of each document as it moves through a document factory.

BRIEF DESCRIPTION OF THE DRAWINGS

FIG. 10 schematically illustrates an outward search for the boundaries of a glyph.

FIG. 12 shows a schematic representation of a sparse kernel for use in the disclosed system.

FIG. 13 illustrates application of the sparse kernel to a glyph image.

FIG. 14 illustrates a search area for finding a maximum correlation response.

DETAILED DESCRIPTION OF THE PREFERRED EMBODIMENT

Figure 1:
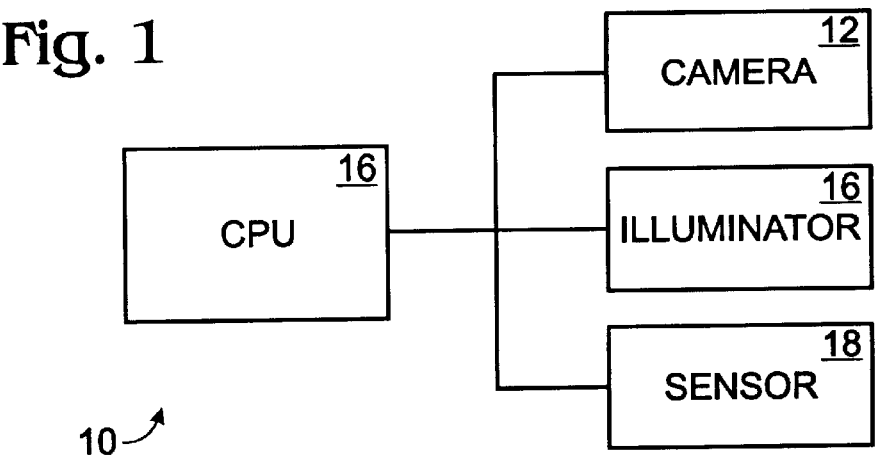
FIG. 1 is a block diagram showing the machine vision system of the present invention, including a camera, illuminator, proximity sensor and central processing unit.

A machine vision system 10 is shown in FIG. 1 and includes a camera 12, preferably a high-resolution digital camera with a CCD sensor and a 16-millimeter fixed focal length lens. An illuminator or radiation source 14, preferably in the form of a pulsed array of LEDs is used to illuminate a document D or other item to be sensed. The pulses of illuminator 14 and the image produced by camera 12 are controlled and monitored by a CPU 16.

A proximity sensor 18 is used to signal CPU 16 that the leading edge of a document D has passed beneath proximity sensor 18. CPU 16 then calculates an appropriate delay before triggering pulses of illumination from illuminator 14. Images from camera 12 are monitored by CPU 16 during appropriate time periods, based on the pulses provided by illuminator 14.

Figure 2:
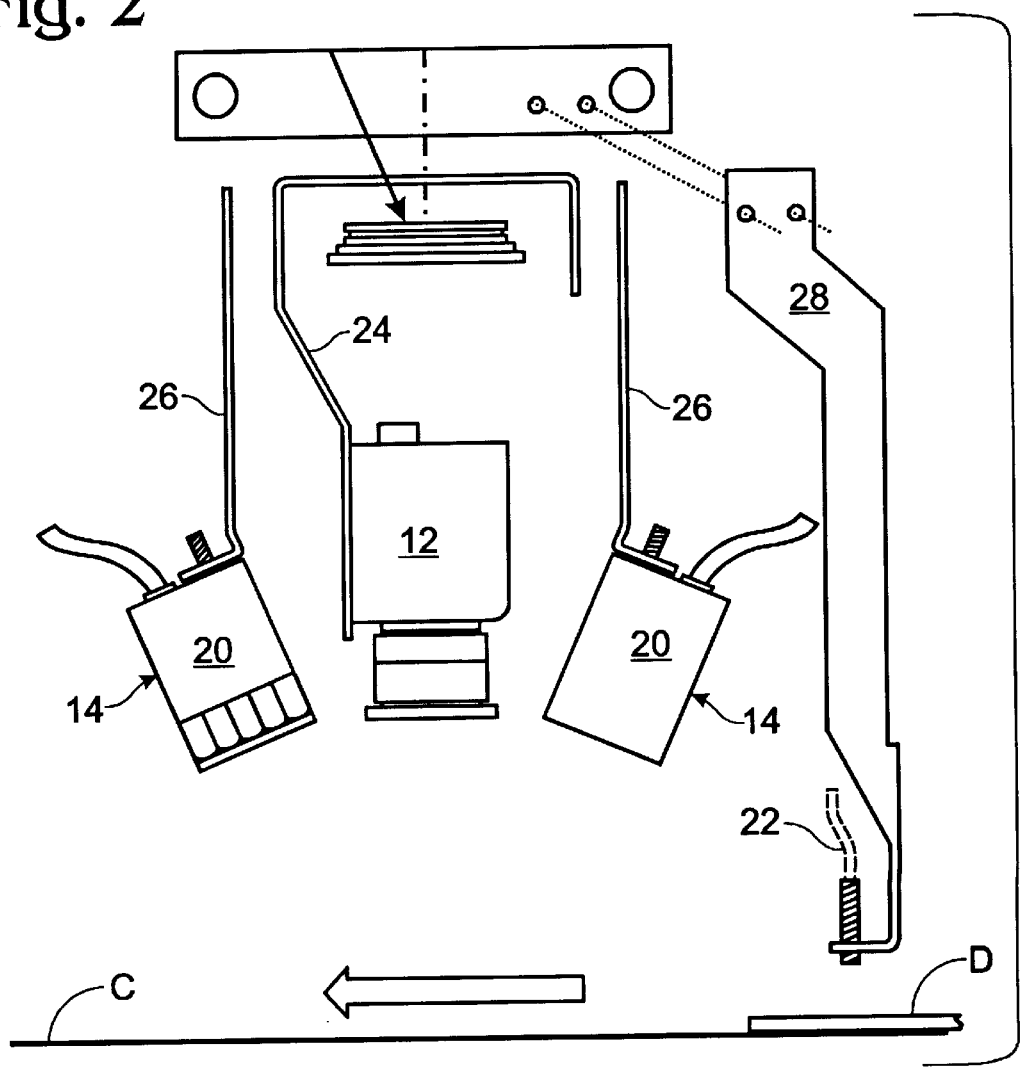
FIG. 2 is a side elevation showing the camera, illuminator and proximity sensor of FIG. 1, partially assembled and cut-away, in proper angular relation to a conveyor belt.
Figure 3:
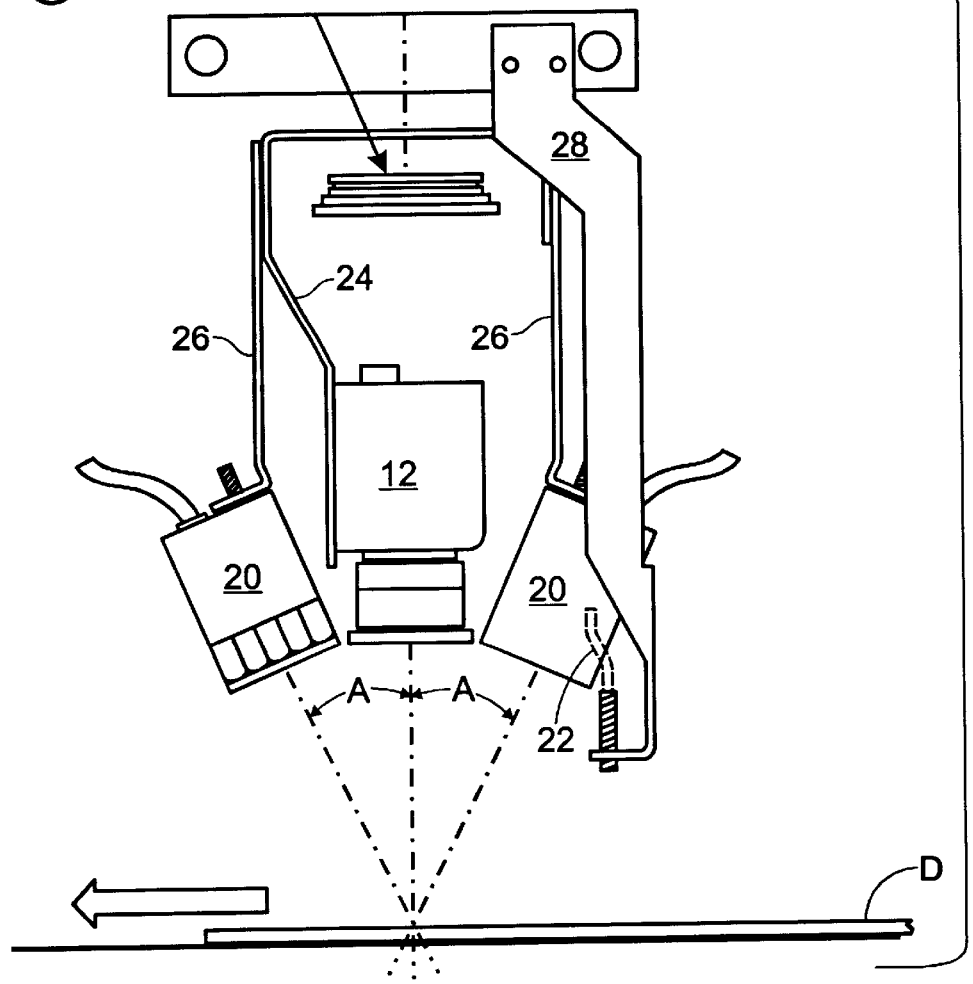
FIG. 3 is a plan view of the components of the machine vision system shown in FIG. 2, as assembled.

FIG. 2 shows a more detailed representation of the arrangement of the camera and related components of machine vision system 10. Camera 12 preferably is mounted approximately perpendicular to a conveyor C that carries documents D to be scanned. Illuminator 14 includes opposed, angled LED canisters 20 mounted on either side of camera 12, preferably at an angle A of approximately 21-degrees to either side of the axis of camera 12, as shown in FIG. 3. For glyphs printed on paper, it has been found that an array of twenty LEDs emitting approximately 690 nanometer-wavelength light works well with the LEDs grouped tightly in a cylindrical canister, and with a diffusing lens mounted between (or as part of) illuminator 14 and document D. One of the canisters is shown cutaway to illustrate its internal structure. Other wavelengths of electromagnetic radiation may be used, with appropriate changes of the radiation source and sensor, but the visible light source and sensor of the described illuminator 14 and camera 12 are believed to work well for most document reading.

The disclosed proximity sensor is light-based, and includes a fiber optic cable 22 that is mounted adjacent conveyor C, aimed approximately perpendicularly to conveyor C. Conveyor C moves at speeds up to 400-inches per second. In the disclosed embodiment, illuminator 14 is pulsed to produce a flash of light for approximately 10-microseconds, and approximately 10 separate images are taken by producing 10 separate pulses.

Various brackets, including a camera bracket 24, illuminator brackets 26, and proximity sensor bracket 28 are attached as shown in FIGS. 2 and 3 to mount the associated components. Brackets 26 preferably mount directly to bracket 24, through spot welding or screws, and brackets 24 and 28 mount to a supporting block 30.

Figure 4:
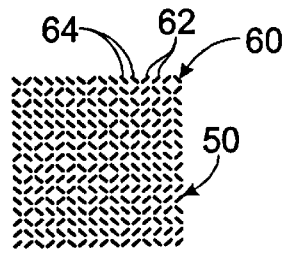
FIG. 4 shows a typical glyph with non-glyph clutter on a document.
Figure 4:
Figure 5:
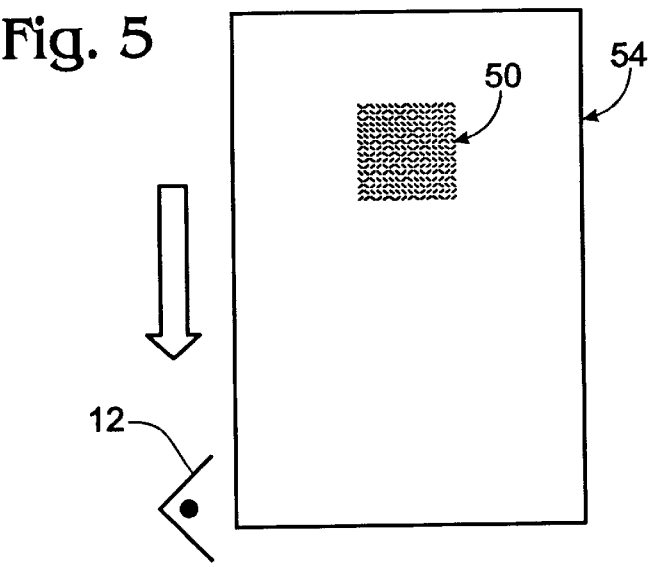
FIGS. 5–7 illustrate the acquisition of images of bands of a document according to the present invention.
Figure 6:
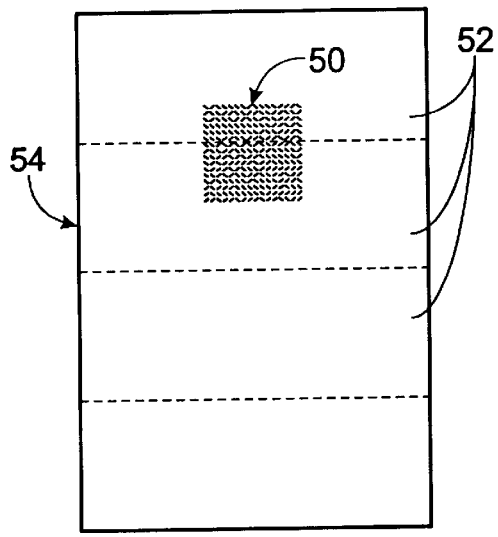
Figure 7:
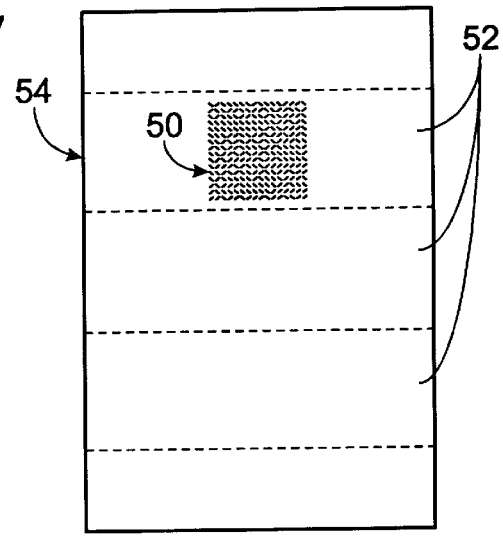

A typical glyph 50 is shown in FIG. 4 with associated marks that may be present on the document to be scanned. The glyph includes rows and columns of symbols 60, including upstroke symbols 62 and downstroke symbols 64. Of course, other types of symbols could be used as well. The first step in reading the glyph is to acquire or capture an image of the glyph. Acquiring an image of glyph 50 involves capturing a series of images of overlapping bands 52 along a document 54, as illustrated in FIGS. 5–7. FIGS. 6 and 7 depict schematically the relative positions of the two sets of bands. Each band has a width approximately twice the size of the glyph to insure that the entire glyph is contained in one of the bands. Typically, the bands extend across the width of the document perpendicular to the direction of travel.

If there are known constraints on the position of the glyph on the document, it may not be necessary to acquire bands covering the entire document. For instance, if it is known that that the glyph will be printed at the trailing edge of a document, only that portion of the document need be acquired. Moreover, if the exact position of the glyph is known, it may only be necessary to acquire one small image containing the glyph, rather than a series of overlapping bands. Of course, it is also possible to acquire an image of the entire document at one time for subsequent processing. Use of bands, however, reduces the demand for memory since the glyph is typically very small relative to the entire document.

Figure 8:
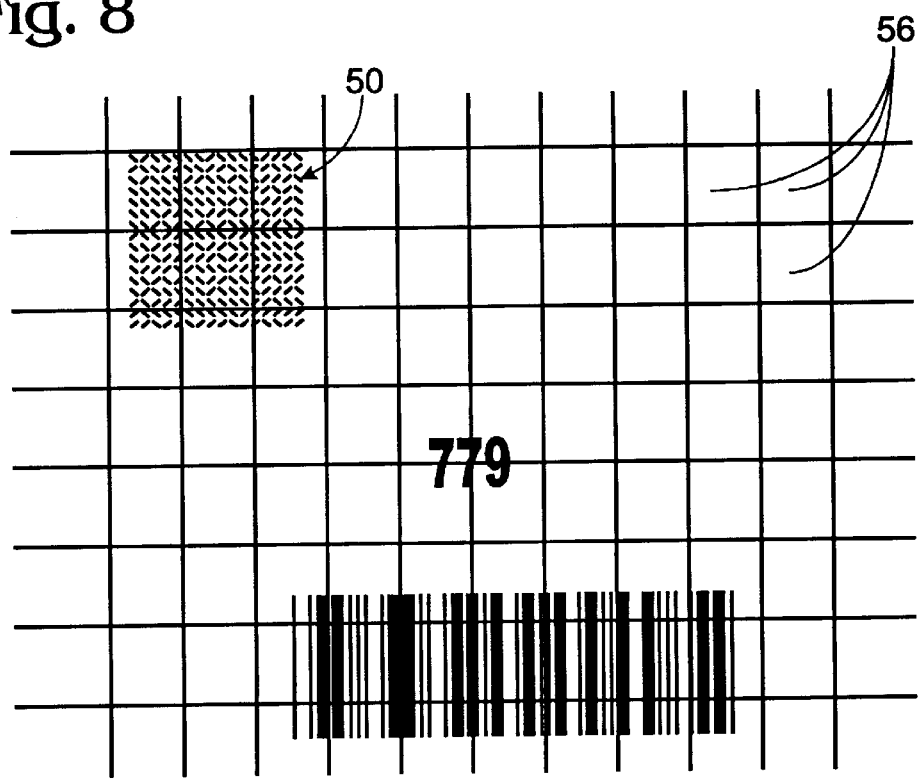
FIG. 8 illustrates the partitioning of an image into blocks for subsequent processing.

After acquiring images of the series of bands, the band images are processed to make a coarse determination of the location of the glyph. In particular, each image is divided into a series of square blocks 56 of pixels. The size of the block, for instance 32×32, is chosen to be slightly less than one-half of the size of the glyph. This insures that at least one of the blocks will fall entirely within the glyph. See FIG. 8.

Each block is processed to determine how much it resembles a glyph. This is accomplished in the disclosed embodiment by calculating vertical and horizontal projections for each block as follows:

$$v[y] = \sum_{x=1}^{BlockSize} Block[x, y]$$

$$h[x] = \sum_{y=1}^{BlockSize} Block[x, y]$$

Figure 9:
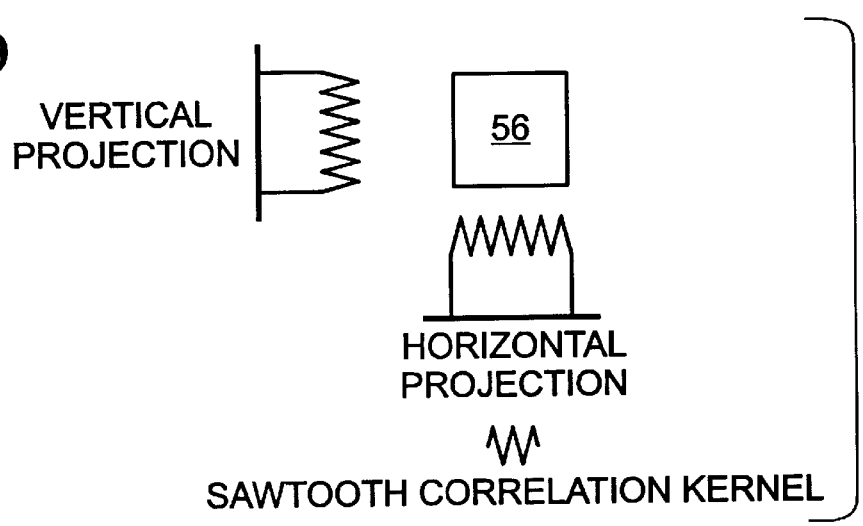
FIG. 9 illustrates the process of computing one-dimensional projections according to the present invention.

See FIG. 9. These projections are then compared to a generally saw-tooth or step-function shaped reference projection or kernel based on the appearance of an average glyph. More specifically, a series of correlations are computed between the reference projection and the vertical projections to locate a maximum correlation for each block. It is necessary to compute a series of correlations because the location of the strokes within the part of a glyph contained in the block is unknown. Therefore, the correlations must be computed over a series of shifted positions or phases spanning a range equivalent to the spacing between strokes to insure that the maximum correlation value is located. A suitable reference projection is:

$$ref=[2, 1, -2, -2, -2, -1, 2, 2, 2, 0, -2, -2, -2, 0, 2, 2, 1, -1, -2, -2, -1, 1, 2, 2, 0]$$

It should be noted that the reference function only includes 25 elements to allow a complete correlation to be conducted at each of 8 shifted positions in the depicted example. Also, the values used in the reference function are chosen to reflect real world printing and image capture variations. Thus, the boundaries between rows or columns of strokes are not perfectly defined.

After computing the horizontal and vertical correlations for each of the blocks, an overall score is computed for each block as follows:

$$block\_score = 0.5 \frac{max\_hor\_cor\_block}{max\_hor\_cor\_overall} + 0.5 \frac{max\_vert\_cor\_block}{max\_vert\_cor\_overall}$$

where the max_hor_cor_block is the maximum correlation located in the particular block and the max_hor_col_overall is the maximum horizontal correlation found in any block. The block with the maximum block_score in any of the blocks in any of the bands is taken as the coarse location of the glyph.

Once the coarse position of the glyph is determined, the image is searched outwardly from the box to locate the boundaries of the glyph, as indicated schematically in FIG. 10. The outward search of the disclosed embodiment relies on the relative contrast between regions of the image containing strokes and regions between strokes. Typically it will be assumed that the brightness W of the paper will be at least twice the brightness of printed pixels B on the page.

Figure 11:
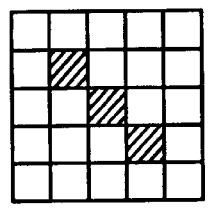
FIG. 11 illustrates the pixel structure of a symbol forming part of a glyph.

As shown in FIG. 11, symbols or strokes in the disclosed embodiment are printed as an upwardly or downwardly oriented pattern of three black pixels on a five-by-five cell having a white background. It should be noted that the patterns for the two types of symbols have a region of overlap at the center where there is a black pixel for either stroke type. The vertical or horizontal projections through regions containing strokes will have an average brightness of 0.8W+0.2B, i.e., one in five pixels will be black along any line. Regions between strokes will have an average brightness of W because they contain no black pixels. By applying the constraint that $W \geq 2 \times B$, the ratio of the average brightness in stroke regions to average brightness between columns or rows of strokes is determined to be $\leq 0.9$.

To find the extent of the glyph, a search is conducted in each direction from the center of the block outward until the edge of the glyph is located. The pseudo-code algorithm set forth in Table 1 illustrates how the search is conducted to find the right edge of the glyph. The searches in the other three directions are essentially the same.

TABLE 1

```
// initialize valleys and peaks by finding the valley and
// peak in the distance from one stroke to the next
previous_peak_pixel = 0
previous_peak_value = 0
previous_valley_pixel=0
previous_valley_value=0
previous_was_peak=false
pixel = "center pixel of block"
stroke_distance="distance from one stroke to another stroke"
    while(pixel <= "center pixel of block" + stroke_distance) // traverse one stroke distance
       {
       pixel_value = h[pixel]
       if ("pixel_value is less than all its neighbors") // at the bottom of a valley
          {
          previous_valley_pixel = pixel
          previous_valley_value = pixel_value
          previous was_peak=false
          }
       else if ("pixel_value is greater than all its neighbors") // at the top of a peak
          {
          previous_peak_pixel = pixel
          previous_peak_value = pixel_value
          previous_was_peak = true
          }
      pixel++;           // move to next pixel
   } // end while traversing one stroke distance
contrast_threshold = 0.9
while (pixel < image_width)       // while extending rightward
   {
   pixel_value = h[pixel]
   if (previous_was_peak)       // heading downward
      {
      if ("pixel_value is less than all its neighbors" and
      (pixel_value/previous_peak_value)<=contrast_threshold)
         {                    // at the bottom of a valley
         previous_valley_pixel = pixel
         previous_valley_value = pixel_value
         previous_was_peak = false
         }
      }
   else
      {                         // heading upward
       if ("pixel_value is greater than all its neighbors" and
          (previous_valley_value/pixel_value)<=contrast_threshold)
          {                    // at the top of a peak
          previous_peak_pixel = pixel
          previous_peak_value = pixel_value
          previous_was_peak = true
          }
       }
   if (previous_was_peak)
      {
       if ( (pixel - previous_peak_pixel)>=stroke_distance)
           break // should have encountered a valley by now
      }
   else
      {
      if (pixel - previous_valley_pixel) >= stroke_distance)
          break // should have encountered a peak by now
      }
   pixel++            // move to next pixel
   }                  // end while extending rightward
glyph_extent_right = pixel // record how far the search went on the right
```

Once the extent of the glyph is determined, it is desirable to more precisely locate the top-left corner of the glyph. In the disclosed embodiment, this is accomplished by running a correlation with a sparse kernel 70 as illustrated in FIG. 12. The kernel is divided into cells 72 corresponding in size to the symbol cell size. The spacing between non-zero entries in the kernel matches the cell size and therefore the inter-stroke spacing within the glyph. See FIG. 13. The non-zero values are positioned at the region of intersection of the two symbol types so that, when the correlation kernel is properly aligned, a strong response is generated for both upstrokes and downstrokes.

By placing positive values in the top and left rows and negative values in the lower right section, the correlation response is maximized when the kernel is centered with the upper left negative one centered over the top left stroke. When the kernel is centered at this location, the negative values are multiplied by the low brightness pixel values at the centers of the stroke and the positive values in the kernel are multiplied by the high brightness pixel values in the white space around the glyph. In searching for the maximum, correlations are typically taken over a range of 10–25 pixels horizontally and vertically, as indicated by the box 74 in FIG. 14. It should be understood that it is possible to ignore any entries in the kernel that are equal to zero when computing the correlation value. Use of a plus or minus one in the non-zero entries makes the correlation computation into a simple series of additions. Thus, although the effect of the disclosed system is to utilize a sparse kernel, the actual implementation would simply sum periodically spaced pixels in the image.

Having relatively precisely located the glyph and a starting stroke in the glyph, each stroke is processed to determine whether it is an up or a down stroke. The processing of strokes is summarized in Table 2.

TABLE 2

```
for each row in the glyph
{
        for each column in the glyph
        {
                <refine the location of the stroke>
                <read the stroke>
                <advance to the next stroke>
        }
        <advance to the next glyph row>
}
```

As set forth in Table 2, the first step in processing a stroke is to further refine the location. This is accomplished in the disclosed embodiment by searching for a minimum pixel over a block 78 of pixels centered at the expected center of the stroke. See FIG. 15. A typical size for this block is 5×5 pixels. This refinement process allows the system to accommodate slight printing variations in the stroke location or size.

Figures 15, 16:
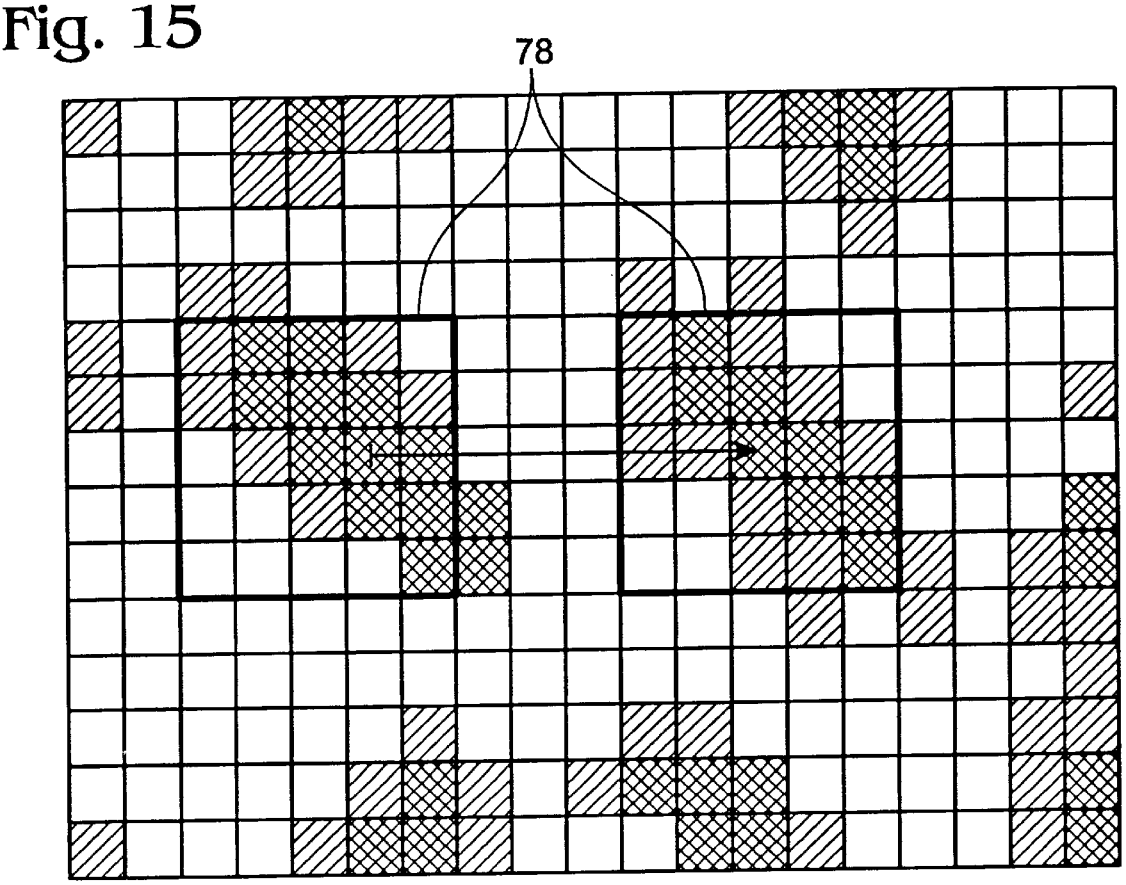
FIG. 15 illustrates a search area for refinement of symbol location.
FIG. 16 illustrates a correlation function for discriminating symbols.

After the refinement of the location of a stroke is completed, a square block of pixels centered on the stroke is correlated with an X-shaped kernel 80 as shown in FIG. 16. The X-shaped kernel includes negative ones in one diagonal and positive ones in the other diagonal. The entry at the region of intersection of the two diagonals is zero since the brightness of the corresponding pixel is not indicative of whether the stroke is an upstroke or a downstroke. If the stroke is a down stroke, the result of the correlation will be greater than zero because of the additive effect of the brighter white pixels in the other diagonal. If the stroke is an upstroke, on the other hand, the correlation will be negative because of the subtractive effect of the brighter white pixels on the downstroke diagonal. A threshold value can be incorporated wherein the system reports the stroke as unknown unless the result of the correlation exceeds the threshold.

The next stroke is located by adding the nominal distance between strokes to the refined position of the current stroke and then refining the location of the new stroke as previously described. This process is repeated for each of the strokes and the resulting pattern of upstrokes and downstrokes is converted to a string of ones and zeros. In the disclosed embodiment, the resultant data string is used to verify that the document has been printed on the correct stock, for example, or to verify proper association of documents. It should be recognized that the disclosed system can be used to locate and decode multiple glyphs on the same document, some of which may be placed on the document at different stages in the document processing, or be pre-printed on the document in the case of forms.

It should be understood that the pixel resolution of the image acquisition system might be different than the printing resolution. In such cases, appropriate scale factors are used to adjust the expected spacing between glyphs, stroke sizes and other known properties of the printed image.

Although it has been possible to read glyphs in the past, the techniques disclosed herein and the concepts embodied therein contribute to speeding up the process of reading glyphs sufficiently to allow real-time use in high-speed printing and document handling. In particular, using the disclosed system, it is possible to read glyphs in approximately 20 ms using a 266 Mhz Pentium II processor with an error rate of approximately one in one-hundred thousand.

Additional details of the user interface and operational details of the system disclosed herein are described in Xreader, High Speed Glyph Reader for Xerox, Operations Manual and Troubleshooting Guide, Copyright 1998, FSI Automation, Inc., which is incorporated herein by reference.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are different from, broader, narrower or equal in scope to the original claims, are also regarded as included within the subject matter of applicants' invention.

We claim:

1. A method of locating a glyph on a document, where the glyph contains symbols positioned in a grid of rows and columns, the method comprising:

scanning the document to acquire at least one image of at least part of the document;

preparing a one-dimensional kernel function having a strong correlation response when aligned with a one-dimensional projection of a glyph;

computing a one-dimensional projection over at least part of the image, where the at least part of the at least one image includes at least part of the glyph;

correlating the one-dimensional projection with the kernel function, where the kernel is located at a selected position in the projection;

repeating the step of correlating for a plurality of relative positions of the kernel in the one dimensional projection; and analyzing the results of the repeated correlations to locate a position where there is an extremum in correlation response.

2. The method of claim 1, wherein the kernel is a saw-tooth kernel.

3. The method of claim 1, wherein the glyph contains upstroke and downstroke symbols.

4. The method of claim 1, wherein the step of scanning includes acquiring images of plural overlapping areas of the document.

5. The method of claim 4, wherein the areas have a minimum dimension at least twice as large as the maximum dimension of the glyph.

6. The method of claim 4, wherein the areas are chosen as bands extending across one dimension of the document, and where the bands are half-overlapping with each other.

7. The method of claim 1, wherein the glyph includes symbols of a first type and a second type, each type having a predetermined pattern with the two patterns having a region of intersection, each symbol defining a cell, and further comprising the steps of:

forming a second kernel function including a plurality of cells corresponding to the symbol cells, at least a portion of the kernel cells including non-zero entries at locations corresponding to the region of intersection of the symbol cells; and conducting a correlation of the second kernel function with a selected portion of the image for a plurality of selected portions of the image to search for a maximum correlation response.

8. The method of claim 7 further comprising the steps of forming a third kernel function, where the third kernel function includes positive entries in locations corresponding to the pattern of the first symbol type and negative entries in locations corresponding to the pattern of the second symbol type;

computing a correlation between the kernel function and a symbol cell in the glyph; and declaring the symbol to be of the first type if the result of the correlation exceeds a first predetermined value and declaring the symbol to be of the second type if the result of the correlation is less than a second predetermined value.

9. A method of decoding symbols from an image of a glyph, where there are first and second symbol types in the glyph, each symbol type having a predetermined pattern, the method comprising:

forming a kernel function, where the kernel function includes positive entries in locations corresponding to the pattern of the first symbol type and negative entries in locations corresponding to the pattern of the second symbol type;

computing a correlation between the kernel function and a symbol in the glyph; and declaring the symbol to be of the first type if the result of the correlation exceeds a first predetermined value and declaring the symbol to be of the second type if the result of the correlation is less than a second predetermined value.

10. The method of claim 9, wherein the first and second predetermined values are both equal to zero.

11. The method of claim 9, wherein the entries in the kernel function which do not correspond to the pattern of either symbol type are zero.

12. The method of claim 9, wherein the positive entries are all equal to one.

13. The method of claim 9, wherein the first and second symbol types are upstrokes and downstrokes, respectively.

14. The method of claim 13, wherein the kernel function has non-zero entries along diagonals thereof.

15. A method of finding the location of symbols within an image incorporating a glyph with a plurality of symbols disposed in a regular array of cells therein, where the symbols include a first type and a second type, each type having a predetermined pattern with the two patterns having a region of intersection, the method comprising:

forming a correlation kernel including a plurality of cells corresponding to the symbol cells, at least a portion of the kernel cell including non-zero entries at locations corresponding to the region of intersection of the symbol cells; and conducting a correlation of the kernel with a selected portion of the image for a plurality of selected portions of the image to search for a maximum correlation response.

16. The method of claim 15, wherein only the locations in the correlation kernel corresponding to regions of intersection are non-zero.

17. The method of claim 15, wherein there are between 4 and 10 cells in the correlation kernel.

18. The method of claim 15, wherein the entries in cells along a first side of the correlation kernel are opposite in sign to the entries in cells not along a side of the correlation kernel.

19. The method of claim 18, wherein the entries in cells along a second side adjacent the first side of the correlation kernel are opposite in sign to the entries in cells not along a side of the correlation kernel.

20. The method of claim 15, wherein no more than one entry in each cell is non-zero.

21. The method of claim 15, wherein the non-zero entries have a magnitude of one.

* * * * *